(12) United States Patent     (10) Patent No.: US 8,812,678 B2
Bihani et al.     (45) Date of Patent: Aug. 19, 2014

(54) INTEGRATION OF AN APPLICATION SERVER AND DATA GRID

(75) Inventors: Ballav Bihani, Fremont, CA (US); Ioannis Cosmadopoulos, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 748 days.

(21) Appl. No.: 13/078,610

(22) Filed: Apr. 1, 2011

(65) Prior Publication Data

US 2012/0254436 A1    Oct. 4, 2012

(51) Int. Cl.
*G06F 15/173* (2006.01)
*G06F 9/06* (2006.01)

(52) U.S. Cl.
CPC ........................................ *G06F 9/06* (2013.01)
USPC .......................................................... 709/226

(58) Field of Classification Search
CPC ......................................................... G06F 9/06
USPC .......................................................... 709/226
See application file for complete search history.

(56) References Cited

U.S. PATENT DOCUMENTS

2010/0107172 A1*   4/2010   Calinescu et al. ............ 718/104
2012/0254383 A1*   10/2012   Cosmadopoulos et al. .. 709/221

OTHER PUBLICATIONS

Oracle Enterprise Manager Getting Started Guide for Oracle Coherence, Apr. 2009, 10g Release 5 (10.2.0.5), pp. 1-10.*
Oracle Enterprise Manager Concepts, Mar. 2009, 10g Release 5 (10.2.0.5), pp. 1-266.*
Oracle Enterprise Manager, Dec. 2009, 10g Release 5 (10.2.0.5), pp. 1-350.*

* cited by examiner

*Primary Examiner* — Jung Park
*Assistant Examiner* — Albert Shih
(74) *Attorney, Agent, or Firm* — Meyer IP Law Group (57) ABSTRACT

Described herein are systems and methods for providing a software application executing on an application server direct access to at least one of a distributed data or distributed service provided by a data grid. The system includes an application server having software applications executing thereon, and a data grid including a plurality of nodes, wherein each of the plurality of nodes is adapted to provide at least one of a distributed data or distributed service. A resource configuration specified by one of a resource annotation added in the software applications or a resource reference defined in a deployment descriptor of said software applications is provided. Upon deployment of the software applications, the resource configuration is used by the system to provide the software applications direct access the distributed data and the distributed services provided by the data grid.

20 Claims, 6 Drawing Sheets

INTEGRATION OF AN APPLICATION SERVER AND DATA GRID

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and application servers, and are particularly related to systems and methods for providing improved integration in an environment that includes an application server and data grid.

BACKGROUND

Enterprise applications require fast access to application data and application services. Typically, in an environment that includes an application server (e.g., a WebLogic server or another application server) and a data grid (e.g., Coherence), the application data and application services have been managed in the data grid separately from the application server. Applications running in the application server do not have direct access to the application data and application services provided by the data grid. Additionally, the data grid can not be directly managed from within the application server. These are the areas that embodiments of the invention are intended to address.

SUMMARY

Described herein are systems and methods for providing a software application executing on an application server (e.g., a WebLogic or another application server) direct access to at least one of a distributed data or distributed service provided by a data grid (e.g., Coherence), and for managing nodes in the data grid from within the application server. In accordance with an embodiment, the system includes a computer which includes an application server, and one or more software applications executing thereon, and a data grid which includes a plurality of nodes, wherein each of the plurality of nodes is adapted to provide at least one of a distributed data or distributed service. In accordance with an embodiment, the system includes a resource configuration specified either by a resource annotation added in the software applications or a resource reference defined in a deployment descriptor of the software applications. In accordance with an embodiment, the resource configuration specifies a named resource provided by the application server and accessible to the software applications, and a mapping between the named resource and one or more of the distributed data or distributed services provided by the data grid. In accordance with an embodiment, as deployed, each application uses the mapping provided by the resource configuration to thereafter directly access the distributed data and the distributed services provided by the data grid.

DETAILED DESCRIPTION

Described herein are systems and methods for providing a software application executing on an application server (e.g., a WebLogic or another application server) direct access to at least one of a distributed data or distributed service provided by a data grid (e.g., Coherence), and for managing nodes in the data grid from within the application server. In accordance with an embodiment, the system includes a computer which includes an application server, and one or more software applications executing thereon, and a data grid which includes a plurality of nodes, wherein each of the plurality of nodes is adapted to provide at least one of a distributed data or distributed service. In accordance with an embodiment, the system includes a resource configuration specified either by a resource annotation added in the software applications or a resource reference defined in a deployment descriptor of the software applications. In accordance with an embodiment, the resource configuration specifies a named resource provided by the application server and accessible to the software applications, and a mapping between the named resource and one or more of the distributed data or distributed services provided by the data grid. In accordance with an embodiment, as deployed, each application uses the mapping provided by the resource configuration to thereafter directly access the distributed data and the distributed services provided by the data grid.

Figure 1:
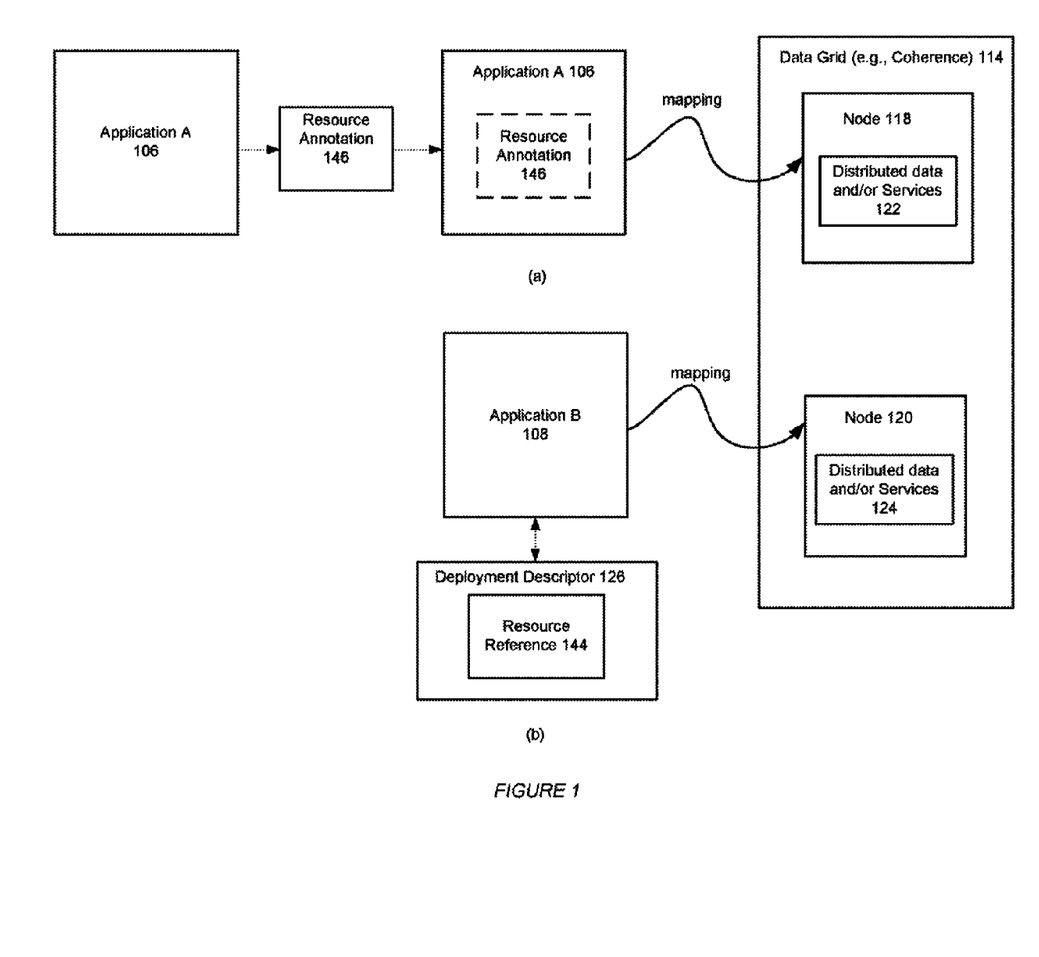
FIG. 1 shows an exemplary system for providing a software application executing on an application server direct access to at least one of a distributed data or distributed service provided by a data grid in accordance with an embodiment.

FIG. 1 is an illustration of a system for providing a software application executing on an application server direct access to at least one of a distributed data or distributed service provided by a data grid, in accordance with an embodiment. As shown in FIG. 1, one or more software applications 106, 108 access a data grid (e.g., Coherence) 114 having a node 118, 120 adapted to provide distributed data and/or distributed services 122, 124 to the software applications. In accordance with an embodiment, a resource configuration specifies a mapping between the software applications and the distributed data and/or distributed services provided by the data grid, and can be specified as one of a resource annotation 146 added in a software application or a resource reference 144 defined in a deployment descriptor 126 of a software application. For example, resource annotation can be added in an application (e.g., Application A), and when the application is deployed on an application server (e.g., a WebLogic server or another application server), the application server can interpret the resource annotation annotated in the application, and modify the operation of the application by injecting code reflecting the mapping between the application and the distributed data or distributed services (e.g., distributed data and/or services 122) on the data grid. The application, as deployed thereafter can directly access the distributed data and/or distributed services provided by the data grid.

Alternatively, in accordance with an embodiment, a resource configuration specified as a resource reference can be used by an application (e.g., Application B) to access distributed data and/or distributed services on a data grid. For example, in accordance with an embodiment, when the application is deployed, an application server interprets the resource reference to identify a mapping between the application and the distributed data and/or distributed services in the data grid. The identified mapping is provided to the application by the application server, thereby modifying the operation of the application to access the distributed data and/or distributed services in the data grid. The application, as deployed, thereafter uses the identified mapping to directly access the distributed data and/or distributed services in the data grid.

Resource Annotation

Figure 2:
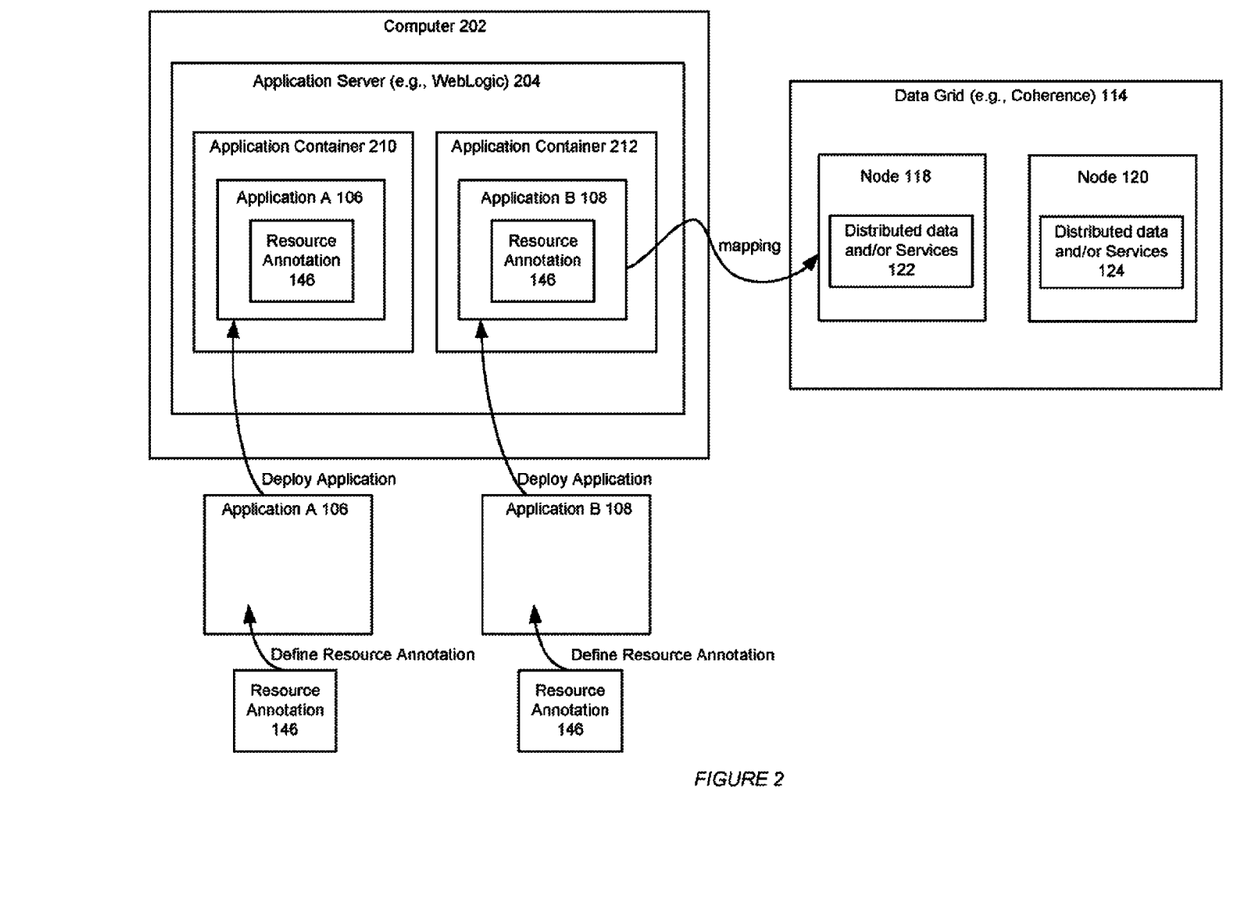
FIG. 2 shows an exemplary system for providing a software application executing on an application server direct access to at least one of a distributed data or distributed service provided by a data grid in accordance with an embodiment that uses resource annotation.

FIG. 2 is an illustration of a system for providing a software application executing on an application server direct access to at least one of a distributed data or distributed service provided by a data grid, in accordance with an embodiment that uses resource annotation. As shown in FIG. 2, a computer 202 running an application server 204 (e.g., a WebLogic server or another application server) includes one or more software applications 106, 108 that are deployed in a container (e.g., containers 210, 212). For example, a web application can be deployed in a web container, while an ejb application can be deployed in an ejb container.

As shown in FIG. 2, the system includes a data grid 114 having a plurality of nodes 118, 120 operating as a cluster, wherein each node in the data grid is adapted to provide distributed data and/or services 122, 124 to the software applications. In accordance with an embodiment, the distributed data can be stored in a computer readable storage medium and/or accessed in the data grid by the software applications, and used by the software applications to accomplish an application task. Additionally, or alternatively, the software applications can use the distributed services provided by the data grid, such as data management, replication and distribution services, to manage application data and/or accomplish an application task. For example, in accordance with an embodiment, the software applications can access the distributed data and/or distributed services to service requests received at the software applications.

As shown in FIG. 2, in accordance with an embodiment, a resource configuration specified as a resource annotation 146 (e.g., @Resource annotation) is defined in each software application. In accordance with an embodiment, the resource configuration specifies a named resource provided by the application server and accessible to the software applications, and provides a mapping between the named resource and the distributed data and/or distributed services provided by the data grid. In accordance with an embodiment, the resource annotation can be phrased such as
@Resource (mappedName="myCache") com.tangosol.net. NamedCache nc;
which can be defined resource annotation defined in the software applications, wherein the @Resource annotation specifies a named resource "NamedCache" and a local cache "myCache" of each application to where the distributed data and/or distributed services is mapped.

In accordance with an embodiment, when the software applications are deployed on the application server (e.g., software Applications A and B), the application server interprets the resource annotation annotated within the software applications, and modifies the operation of the software applications by injecting code reflecting the mapping between the named resource and the distributed data or distributed services, as specified by the resource annotation. The software applications, as deployed, thereafter directly access the distributed data and/or the distributed services provided by the data grid using the mapping provided by the application server. For example, as shown in FIG. 2, Application B uses the mapping provided by the application server to access the distributed data and distributed services provided by a node (e.g., node 118) in the data grid.

Figure 3:
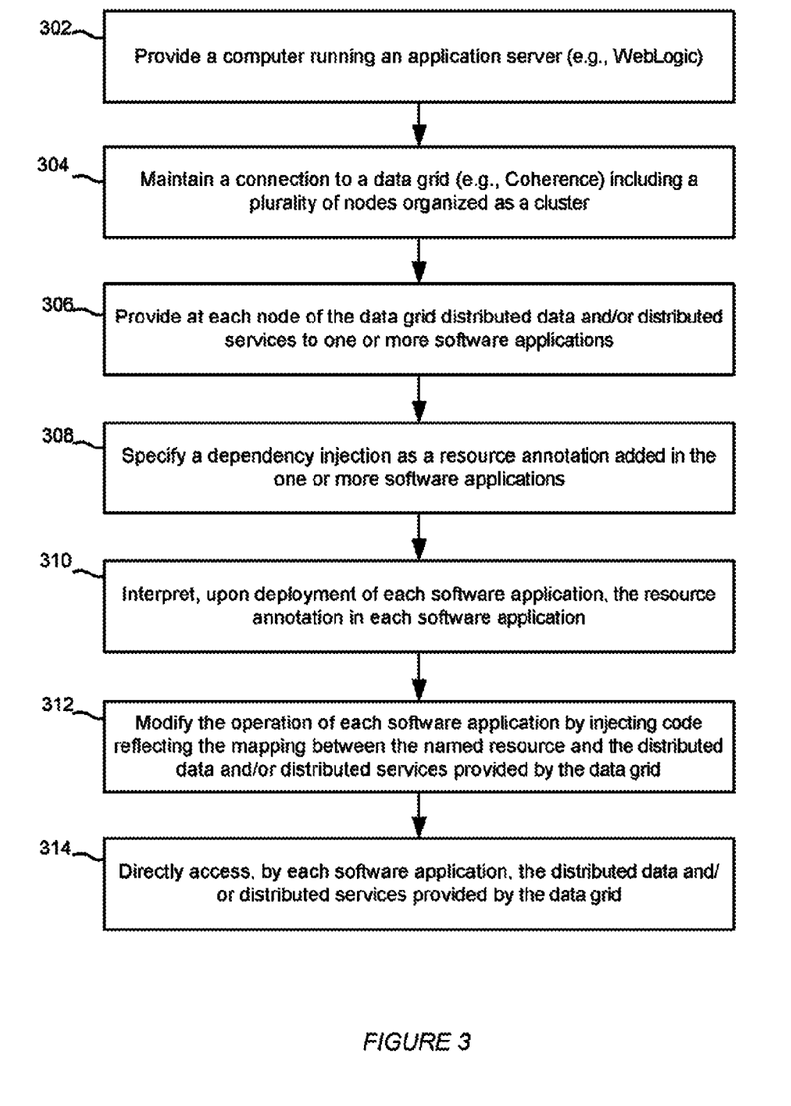
FIG. 3 shows a flowchart of a method in accordance with an embodiment that uses resource annotation, for providing a software application direct access to at least one of a distributed data or distributed service provided by a data grid.

FIG. 3 shows a flowchart of a method in accordance with an embodiment that uses resource annotation, for providing a software application executing on an application server direct access to at least one of a distributed data or distributed service provided by a data grid. At step 302, a computer running an application server is provided. The application server includes software applications, e.g., enterprise software (i.e., business software) and application software. At step 304, a connection to a data grid (e.g., Coherence) is maintained, which includes a plurality of nodes operating as a cluster. In accordance with an embodiment, a node can be a computer having software, e.g., application software and/or running a server (e.g., WebLogic or another server).

At step 306, each node in the data grid provides distributed data and/or distributed services to the software applications. In accordance with an embodiment, the distributed data can be stored and/or accessed in the data grid by the software applications, and used by the software applications to accomplish an application task. Additionally, or alternatively, the software applications can use the distributed services provided by the data grid, such as data management, replication and distribution services, to manage application data and/or accomplish an application task. For example, in accordance with an embodiment, the software applications access the distributed data and distributed services to service requests received at the software applications.

At step 308, a resource configuration specified as a resource annotation is added in the software applications. In accordance with an embodiment, the resource annotation specifies a named resource (e.g., NamedCache) accessible to each software application, and a mapping between the named resource and the distributed data or distributed services provided by the data grid. In accordance with an embodiment, "@Resource (mapped Name="myCache") com.tangosol. net.NamedCache nc;" is an example of a resource annotation, wherein the @Resource annotation specifies a named resource "NamedCache" and a local cache "myCache" of each application to where the distributed data and/or distributed services is mapped.

At step 310, upon deployment of each software application, the resource annotation in each software application is interpreted. At step 312, the operation of the software applications are modified by injecting code reflecting the mapping between the named resource and the distributed data or distributed services, as specified by the resource annotation. At step 314, the software applications, as deployed, thereafter directly access the distributed data or distributed services provided by the data grid.

Resource Reference

Figure 4:
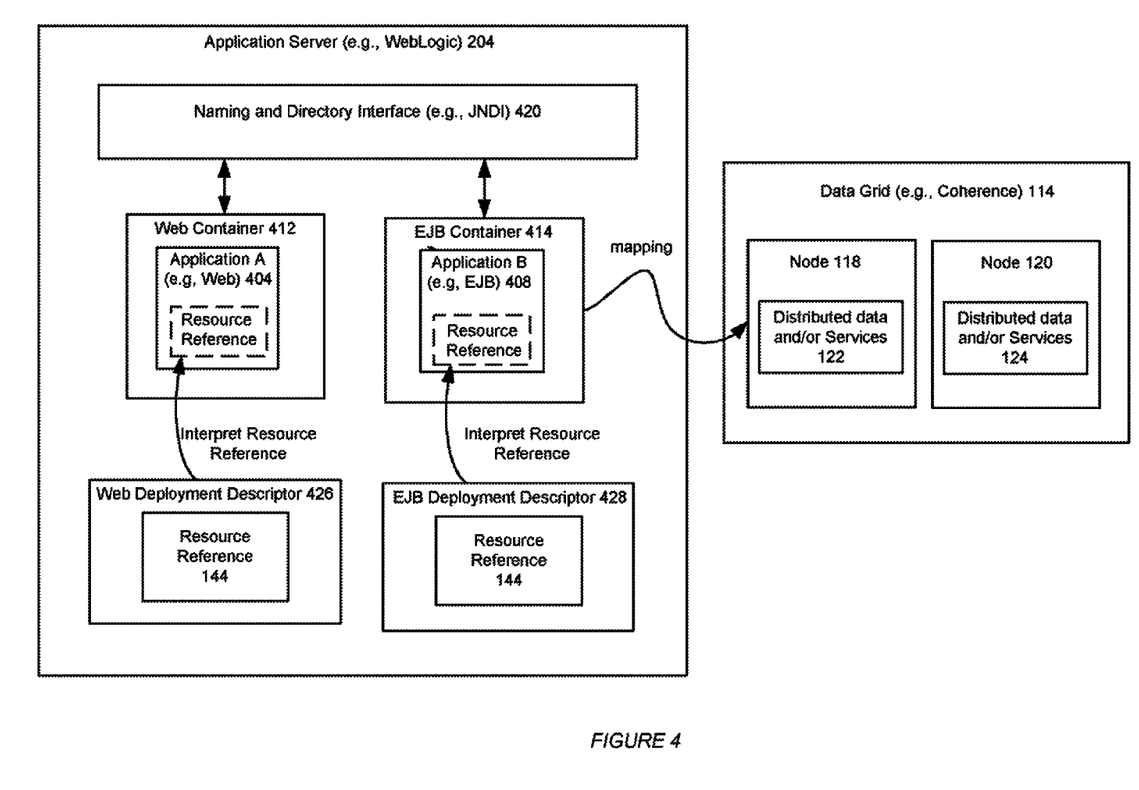
FIG. 4 shows an exemplary system for providing a software application executing on an application server direct access to at least one of a distributed data or distributed service provided by a data grid in accordance with embodiment that uses a resource reference.

FIG. 4 is an illustration of a system for providing a software application executing on an application server direct access to at least one of a distributed data or distributed service provided by a data grid, in accordance with an embodiment that uses a resource reference. As shown in FIG. 4, an application server (e.g., a WebLogic server or another application server) includes one or more software applications 404, 408 that are deployed in a container (e.g., web container 412 and/or EJB container 414).

As shown in FIG. 4, a resource configuration specified as a resource reference 144 (e.g., a resource-ref) is defined in a deployment descriptor (e.g., a web deployment descriptor 426 and/or an EJB deployment descriptor 428) of said software applications, and specifies distributed resources available to the software applications. In accordance with an embodiment, the resource reference specifies a named resource provided by the application server and accessible to the software applications, and a mapping between the named resource and the distributed data or distributed services provided by the data grid. In accordance with an embodiment, an example resource reference is:

```
<resource-ref>
    <res-ref-name> coherence/myCache </res-ref-name>
    <res-type> com.tangosol.net.NamedCache</res-type>
    <res-auth>Container</res-auth>
    <res-sharing-scope>Shareable</res-sharing-scope>
    <mapped-name>myCache</mapped-name>
</resource-ref>
``` wherein the resource reference specifies a named resource "NamedCache" and a local cache "myCache" of each application to where the distributed data and/or distributed services is mapped using a naming and directory interface tree 420 (e.g., a JNDI tree) provided at the application server.

Figure 5:
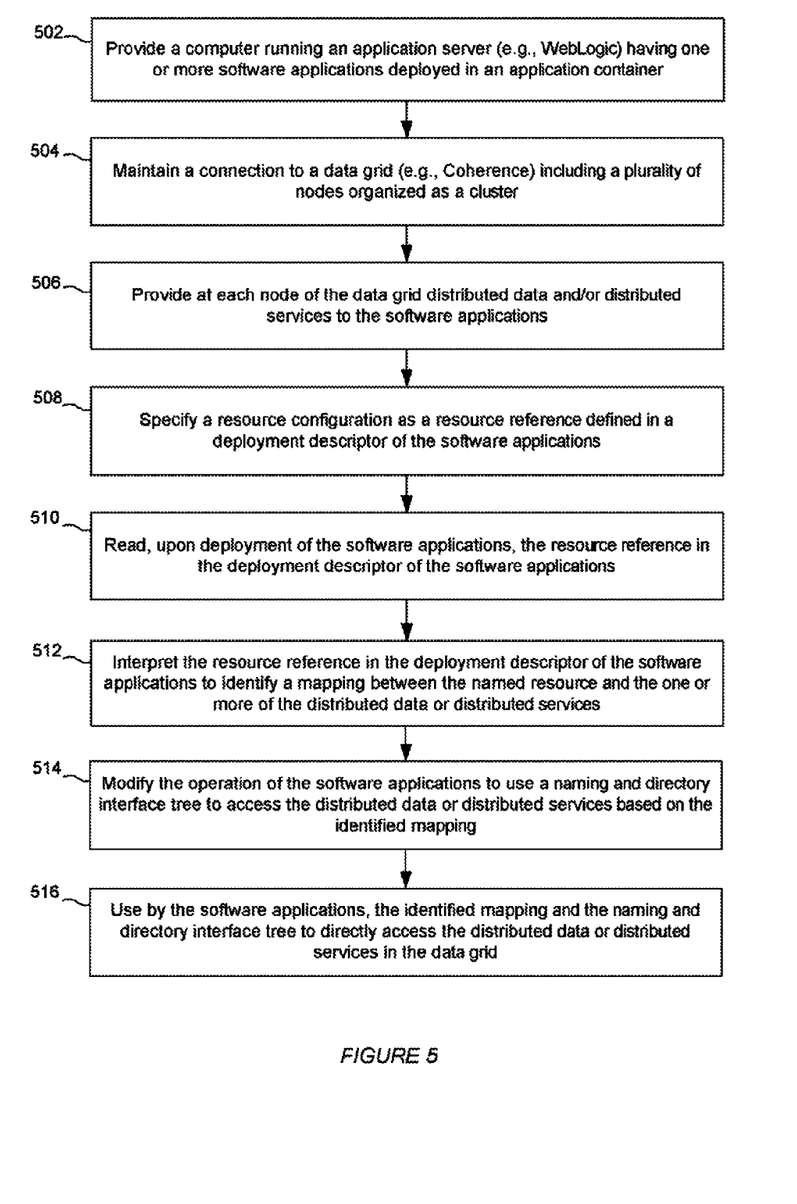
FIG. 5 shows a flowchart of a method in accordance with an embodiment that uses a resource reference, for providing an application direct access to at least one of a distributed data or distributed service provided by a data grid.

In accordance with an embodiment, when the software application is deployed, the application server reads the deployment descriptor of the application, and interprets the resource reference in the deployment descriptor to identify a mapping between the application (e.g., Application B) and the distributed data and/or distributed services on a node (e.g., node 118) in the data grid. In accordance with an embodiment, the resource reference is interpreted and the identified mapping is provided to each application by the application server, thereby modifying the operation of each software application to use a naming and directory interface tree to lookup then access the distributed data and/or distributed services in the data grid. The software applications, as deployed, thereafter use the identified mapping and the naming and directory interface tree to directly access the distributed data or distributed services in the data grid FIG. 5 shows a flowchart of a method in accordance with an embodiment that uses a resource reference, for providing a software application executing on an application server direct access to at least one of a distributed data or distributed service provided by a data grid. At step 502, a computer running an application server is provided that includes one or more software applications. In accordance with an embodiment, each application is deployed in an application container, e.g., a web application is deployed in a web container and an EJB application is deployed in an EJB container. At step 504, a connection to a data grid (e.g., Coherence) is maintained, which includes a plurality of nodes operating as a cluster.

At step 506, each node in the data grid provides distributed data and/or distributed services to the software applications. At step 508, a resource configuration specified as a resource reference is defined in a deployment descriptor of the software applications. In accordance with an embodiment, the resource reference specifies a named resource accessible to the software applications, and a mapping between the named resource the distributed data and/or distributed services provided by the data grid. For example, distributed data represented by the named resource NamedCache is mapped to myCache of each application for use by each application. At step 510, upon deployment of the software applications, the deployment descriptor of the software applications is read. At step 512, the resource reference in the deployment descriptor of the software applications is interpreted to identify a mapping between the named resource and the distributed data or distributed services. At step 514, the operation of the software applications are modified to use a naming and directory interface tree to access the distributed data or distributed services in the data grid. At step 516, the software applications, as deployed, thereafter use the identified mapping and the naming and directory interface tree to directly access the distributed data or distributed services in the data grid.

Node Management using an Application Server Console

Figure 6:
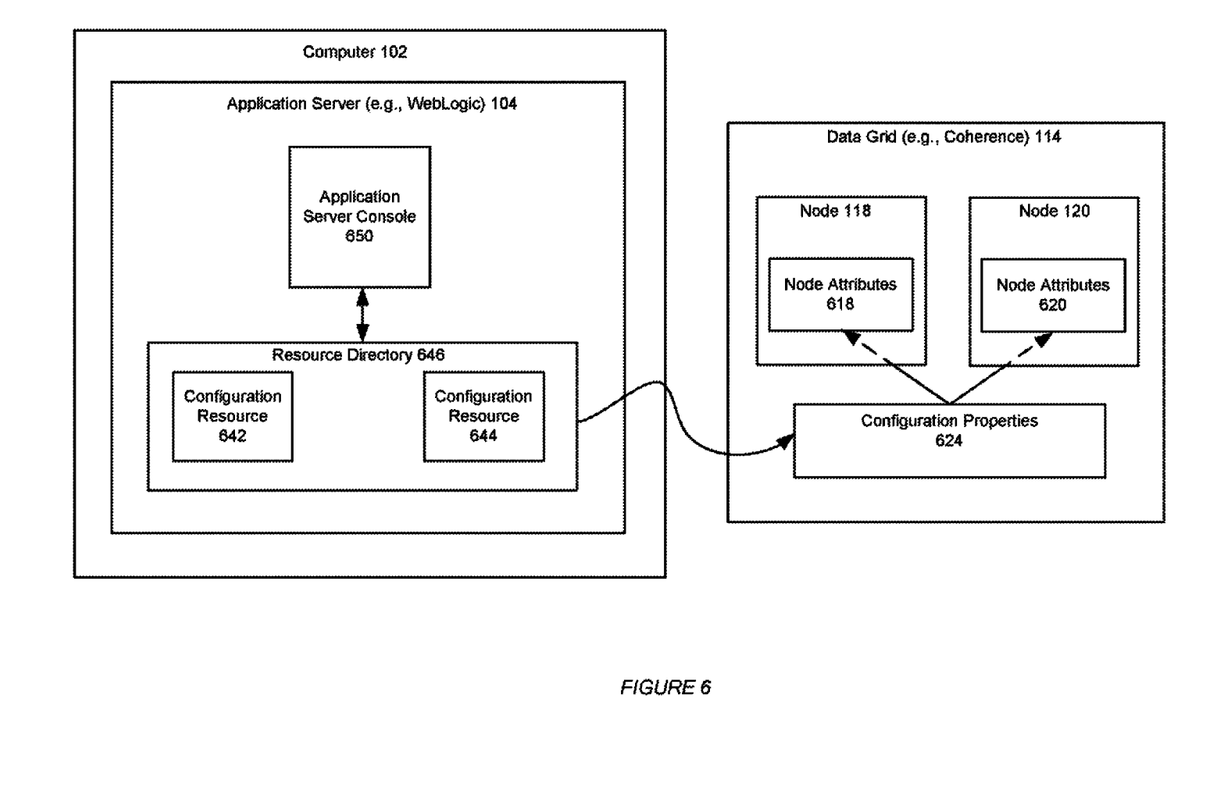
FIG. 6 shows an exemplary system for managing nodes in a data grid within an application server in accordance with an embodiment.

FIG. 6 shows an exemplary system for managing nodes in a data grid within an application server in accordance with an embodiment. As shown in FIG. 6, a computer running an application server (e.g., a WebLogic server or another application server) includes an application server console 650. As shown in FIG. 6, the system includes a data grid having a plurality of nodes operating as a cluster, wherein each node in the data grid has node attributes 618, 620 adapted to define node functionality. In accordance with an embodiment, the node attributes for each node are set using configuration properties 624 stored on the data grid and provided by the application server.

In accordance with an embodiment, the application server console is used to manage a data grid using configuration information in one or more configuration resources 642, 644 stored in a configuration resource directory 646 on the application server. In accordance with an embodiment, the application server console can be accessed remotely, e.g., from a computer remote from the application server. Alternatively, the application server console can be accessed from within the application server. In accordance with an embodiment, the application server console includes a GUI to view, select and/or manage the configuration properties of the plurality of nodes in the data grid.

In accordance with an embodiment, the configuration information in the configuration resources can be used to declare node attributes for the plurality of nodes, such as multicast address/port and/or unicast address/port. In accordance with an embodiment, an example configuration resource is a data grid system resource (e.g., a Coherence-ClusterSystemResourceMBean) that can be used by the application server console to perform one of defining a data node logger name and a message format for the logger, and defining an external configuration resource to override properties of the plurality of nodes not exposed by the application server. In accordance with an embodiment, the application server console stores configuration information in the data grid system resource, and directs the application server to interpret the configuration information in the data grid system resource. In accordance with an embodiment, the application server console modifies the operation of the plurality of nodes by overriding the data grid configuration properties according to the configuration information in the data grid system resource. Upon modifying the data grid configuration properties, the node attributes of the plurality of nodes are updated, and the plurality of nodes thereafter operate according to the configuration information.

Additionally, or alternatively, an example configuration resource can be a data grid runtime resource (e.g., a CoherenceClusterRuntimeMBean) that can be used by the application server console to expose runtime information about the data grid, such as the size of the data grid (e.g., data size, number of nodes), and operating status of each node (e.g., active, not active). In accordance with an embodiment, the data grid system resource and the data grid runtime resource can be stored in the configuration resource directory on a computer readable storage medium, e.g., a WebLogic resource directory, on or otherwise accessible to the application server.

In accordance with an embodiment, the application server console directs the application server to interpret the configuration information in the configuration resources, and to modify the operation of the plurality of nodes in the data grid by overriding data grid configuration properties according to the configuration information in the configuration resources. Upon modifying the data grid configuration properties using the configuration information, the plurality of nodes thereafter operate according to the configuration information. For example, in accordance with an embodiment, the GUI can be used to select and display the current configuration properties of one of the plurality of nodes in the data grid. In accordance with an embodiment, the displayed configuration properties can be modified from within the GUI, and configuration information representing the modifications can be saved to a configuration resource. In accordance with an embodiment, once the configuration properties are modified and saved to the configuration resource, the application server console directs the application server to interpret the configuration information in the configuration resource, and to modify the operation of the selected node in the data grid by overriding the configuration properties of the selected node according to the configuration information. In accordance with an embodiment, the selected node thereafter operates according to the configuration information.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a software application executing on an application server direct access to a distributed resource provided by a data grid, comprising
    a computer which includes an application server with a software application executing thereon;
    a data grid which includes a plurality of nodes, wherein each of the plurality of nodes is adapted to provide a distributed resource for use by the software application;
    a resource configuration in the software application, wherein the resource configuration is specified by a resource annotation added in the software application, or defined by a deployment descriptor of said software application, wherein the resource configuration specifies
        a local resource provided by the application server for use by the software application,
        a mapping between the local resource for the software application and the distributed resource;
    wherein when the software application is deployed, the application server
        interprets the resource configuration to identify the mapping between the local resource and the distributed resource, and
        provides the mapping to the software application,
        wherein the software application uses the mapping to access the distributed resource, in addition to directly accessing the local resource, during operation of the software application.

2. The system of claim 1 wherein the application server is a WebLogic server instance.

3. The system of claim 1 wherein the data grid is a Coherence data grid.

4. The system of claim 1, wherein when the resource configuration is specified using a resource annotation added in the software application, upon deployment thereof, the application server
    modifies the operation of the software application by injecting code reflecting the mapping between the local resource and the distributed resource as specified by the resource annotation.

5. The system of claim 1, wherein when the resource configuration is specified using a deployment descriptor of the software application, upon deployment thereof, the application server
    modifies the operation of the software application by using a naming and directory interface tree to access the distributed resource.

6. The system of claim 1, wherein the local resource is a local cache, and the distributed resource is a remote cache.

7. A method of providing a software application executing on an application server direct access to a distributed resource provided by a data grid, comprising:
    maintaining a connection to a data grid executing on one or more microprocessors, wherein the data grid includes a plurality of nodes operating as a cluster, wherein each of the plurality of nodes is adapted to provide a distributed resource for use by the software application;
    specifying a resource configuration using a resource annotation added in the software application or a deployment descriptor of said software application, wherein the resource configuration specifies a local resource provided by the application server for use by the software application, and a mapping between the local resource and the distributed resource;

interpreting the resource configuration, by the application server, to identify the mapping between the local resource and the distributed resource, upon deployment of the software application; and providing the mapping to the software application, where the software application uses the mapping to access the distributed resource, in addition to directly accessing the local resource, during operation of the software application.

8. The method of claim 7 wherein the data grid is a Coherence data grid.

9. The method of claim 7 wherein the resource annotation is @Resource annotation.

10. The method of claim 7, wherein when the resource configuration is specified using a resource annotation added in the software application, upon deployment thereof, the application server modifies the operation of the software application by injecting code reflecting the mapping between the local resource and the distributed resource as specified by the resource annotation.

11. The method of claim 7, wherein when the resource configuration is defined using a deployment descriptor of the software application, upon deployment thereof, the application server modifies the operation of the software application by using a naming and directory interface tree to access the distributed resource.

12. The method of claim 11 wherein the naming and directory interface tree is a JNDI tree.

13. The method of claim 7, wherein the local resource is a local cache, and the distributed resource is a remote cache.

14. A non-transitory computer readable storage medium storing one or more sequences of instructions for providing a software application executing on an application server direct access to a distributed resource provided by a data grid, wherein said instructions, when executed by one or more processors, cause the one or more processors to execute the steps comprising:

maintaining a connection to a data grid executing on one or more microprocessors, wherein the data grid includes a plurality of nodes operating as a cluster, wherein each of the plurality of nodes is adapted to provide a distributed resource for use by the software application;

specifying a resource configuration using a resource annotation added in the software application or a deployment descriptor of said software application, wherein the resource configuration specifies a local resource provided by the application server for use by the software application, and a mapping between the local resource and the distributed resource;

interpreting the resource configuration, by the application server, to identify the mapping between the local resource and the distributed resource, upon deployment of the software application; and providing the mapping to the software application, where the software application uses the mapping to access the distributed resource, in addition to directly accessing the local resource, during operation of the software application.

15. The non-transitory computer readable storage medium of claim 14, wherein the data grid is a Coherence data grid.

16. The non-transitory computer readable storage medium of claim 14, wherein the resource annotation is @Resource annotation.

17. The non-transitory computer readable storage medium of claim 14, wherein when the resource configuration is specified using a resource annotation added in the software application, upon deployment thereof, the application server modifies the operation of the software application by injecting code reflecting the mapping between the resource and the distributed resource as specified by the resource annotation.

18. The non-transitory computer readable storage medium of claim 14, wherein when the resource configuration is defined using a deployment descriptor of the software application, upon deployment thereof, the application server modifies the operation of the software application by using a naming and directory interface tree to access the distributed resource.

19. The non-transitory computer readable storage medium of claim 18, wherein the naming and directory interface tree is a JNDI tree.

20. The non-transitory computer readable storage medium of claim 14, wherein the local resource is a local cache, and the distributed resource is a remote cache.

* * * * *

UNITED STATES PATENT AND TRADEMARK OFFICE
CERTIFICATE OF CORRECTION

PATENT NO. : 8,812,678 B2  
APPLICATION NO. : 13/078610  
DATED : August 19, 2014  
INVENTOR(S) : Bihani et al.

Page 1 of 1

It is certified that error appears in the above-identified patent and that said Letters Patent is hereby corrected as shown below:

In the Specification

In column 4, line 53, delete "(mapped Name" and insert -- (mappedName --, therefor.

In column 5, line 52, delete "grid" and insert -- grid. --, therefor.

Signed and Sealed this
Tenth Day of March, 2015

Michelle K. Lee
*Deputy Director of the United States Patent and Trademark Office*